United States Patent

Petterson et al.

[11] Patent Number: 6,149,805
[45] Date of Patent: *Nov. 21, 2000

[54] DEVICE FOR ADDING OXYGEN TO WATER

[75] Inventors: Bernt Petterson, Gamleby; Sten Kullberg, Linköping, both of Sweden

[73] Assignee: AB Ribea Engineering, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 09/068,243
[22] PCT Filed: Nov. 12, 1996
[86] PCT No.: PCT/SE96/01461
  § 371 Date: May 11, 1998
  § 102(e) Date: May 11, 1998
[87] PCT Pub. No.: WO97/18168
  PCT Pub. Date: May 22, 1997

[30] Foreign Application Priority Data

Nov. 13, 1995 [SE] Sweden .................................. 9504011
Nov. 13, 1995 [SE] Sweden .................................. 9504012

[51] Int. Cl.$^7$ .............................. B01D 21/26; B04C 3/04
[52] U.S. Cl. ..................................... 210/221.2; 210/512.2; 55/349
[58] Field of Search ................................. 210/512.2, 167, 210/151, 198.1, 747, 758, 787, 220, 221.2, 512.1, 170; 55/349

[56] References Cited

U.S. PATENT DOCUMENTS

| 3,862,041 | 1/1975 | Robinson | 210/512.2 |
| 4,168,231 | 9/1979 | Allen et al. | 210/74 |
| 4,511,474 | 4/1985 | Krishna et al. | 210/512.1 |
| 5,273,647 | 12/1993 | Tuszko et al. | 210/221.2 |

FOREIGN PATENT DOCUMENTS

| 0414648 | 2/1991 | European Pat. Off. . |
| 929227 | 5/1982 | U.S.S.R. . |
| 1327926 | 8/1987 | U.S.S.R. . |

*Primary Examiner*—David A. Simmons
*Assistant Examiner*—Frank M. Lawrence
*Attorney, Agent, or Firm*—Hayes, Soloway, Hennessey, Grossman & Hage, P.C.

[57] ABSTRACT

One or more vertically oriented cyclones are arranged for treating polluted water by oxygenizing the water and separating polluting particles contained therein. Each cyclone has a conically tapered open-ended elongated chamber having a top and a bottom. The top is exposed to the air and the bottom is submerged below the surface of the water being treated. The cyclone draws water in through a tangential inlet adjacent the bottom end of the cyclone. Upon entering the cyclone the water to be treated is rotationally moved in a spiral upward along the inside surface of the cyclone. A portion of the water being treated exits the top of the cyclone carrying separated polluting particles, while the majority of the water being treated exits the bottom of the cyclone with air entrapped therein.

3 Claims, 2 Drawing Sheets

DEVICE FOR ADDING OXYGEN TO WATER

DESCRIPTION OF THE PRIOR ART

A major part of the pollution present in waste water is constituted of organic material. To separate waste water from the organic material it is known to use so called biological filter or biological rotors. Adding nature's own ability to take care of organic material, decomposition is achieved by means of microorganisms. For instance, biological rotors of corrugated plastic material constituting a large attachment area for the microorganisms. One half of the rotor is submerged in the water that is to be purified. The plastic surface and the microorganisms on the rotor are alternatingly brought in contact with the water containing organic material that is nutrient and with the oxygen in the air, which is also needed. When sufficient growth has occurred, the growing material comes loose in skinlike flakes falling from the rotor down into the water. The organic material has in this way been converted into a mudlike substance that can be filtered away leaving a cleaner water. This biological purification, however, has the drawback that it is costly and mechanically demanding. The biological rotor surfaces or the biological filter surfaces that are required are large, and there is also the risk of siltation and overload.

SUMMARY OF THE INVENTION

In view of the above, there is a need for a less costly and more trouble free solution for water purification. In accordance with this invention, this is achieved by the water being oxygenized by the use of hydro-cyclones.

As water is fed into a cyclone, a very forceful and accelerated vortex is obtained giving a separation of the material fed through, that is water from particulates in accordance with their specific weight. The heavier particles are thrown outwards and are expelled at one end together with a small amount of water, while purified water is delivered to the other end. In this way, one can separate not only particles that are heavier than the water, but also particles or for instance, drops of oil or drops of solvents from the water. Since, however, hydro-cyclones in order to function satisfactorily must be made very precisely, they will be relatively expensive, and consequently it is not particularly desirable to use hydro-cyclones in connection with, for instance, communal water cleaning plants. The ability of the cyclone to separate suspended particles from a fluid is not the only reason to use hydro-cyclones in connection with biological purification. The real reason why hydro-cyclones despite their comparatively high cost are useful in biological purification, is that the hydro-cyclone creates an under-vacuum that induces a continuous sucking in of air into the water. The cyclone in other words adds oxygen to the water. Even a comparatively small cyclone will result in adding of oxygen corresponding to that of a very large biological rotor.

The importance of oxygenizing the water in biological purification is itself of sufficient interest as the removal of particles from the water. Oxygenizing water by cyclone is even more efficient than the feeding of air with a compressor or pump, as for instance in an aquarium.

A device for oxygenizing polluted water comprised of a cyclone and a water pump can be made comparatively small and easily moveable. It can be placed at locations where one cannot use biological rotors and biological filters, for instance in waters courses, lakes, dams and even recirculation devices for water in car washes. By adding temporary outlet and nutrients from cultivated land, biological purifying takes place closer to the pollution's source. In this way lack of oxygen resulting in death of fish that may follow at discharge of nutrient material can be avoided.

For instance, a pump with motor and cyclone can be arranged in a small raft. The raft can be anchored in such a way that by the sucking in and blowing out respectively of the water it is driven around in a circle thereby efficiently oxygenizing large surfaces of unmoving water. With a suitable dimensioning of the cyclone a comparatively small pump can be used.

In car wash facilities the resulting amount of particulates is so great that it may disturb or even entirely knock out biological purifying processes at communal waste treatment plants. In order to remedy this, recirculating water at car washes has been tried. However, this has the drawback of a bad smell, which is not only disturbing to personnel but also to the customers. Furthermore repeated changes of filter is required.

In view of the above problem this invention also has as its object primarily, to reduce pollution and smell at car washes and secondly, to make the purifying more efficient.

By oxygenizing the water in the car wash facility with a cyclone, the water is then recirculated and reused.

If so desired the oxygenizing cyclone may be used to simultaneously achieve several different types of cleaning at the same time. In addition to the oxygenizing, the cyclone may in a known manner be used to separate heavy non organic particles (for instance sand particles). This may be done even if the cyclone has its pointed end turned upwards. The upwards delivered heavy material (that is delivered together with a small amount of water) may be collected and forwarded to a sedimentation tank. The water delivered downwards contains finely divided air that is forced downwards in the tank by the pressure and the speed of the outrushing water. Since a surplus of air exists in the water when the resulting air bubbles rise towards the surface, they pull light and/or small particles with them up to the surface where a dirty foam is obtained and removed (floatation), for instance to the same sedimentation tank as the heavier pollutions.

Although the use of cyclones does not always result in the desired complete separation of particulates and clean water. That is a very small volume of particles may together in sedimentation tank function so that in the water system of the car wash a separate cleaning step is achieved between one part with particle polluted water and one with water that may be used for washing. The particulates thus do not need to be continuously removed from the system, but are at all times forced to remain in a polluted part (the sedimentation tank) while the purified water in particular, cleaned of scratching particles, may be fed into the washing process, preferably via a buffer reservoir. The purifying can in this way be made much more efficient by restricting the cyclone package to deliver a very small amount of water free from particles that is transferred to the wash water reservoir. Even lighter particles may with the above described floatation by means of a cyclone continuously be transferred to the sedimentation tank which may be emptied of particulate material when so required. Clean water in the sedimentation tank may continuously be tapped from a location where the water has become clear by particles having floated up and sunk down respectively. Since the biologically decomposable material is collected in the sedimentation tank, it is also here that oxygen consuming decomposition essentially takes place.

BRIEF DESCRIPTION OF THE DRAWINGS

Additional advantages and characteristics of the invention are apparent from the following detailed description taken in conjunction with the following drawings, wherein.

DETAILED DESCRIPTION OF PREFERRED EMBODIMENT

Figure 1:
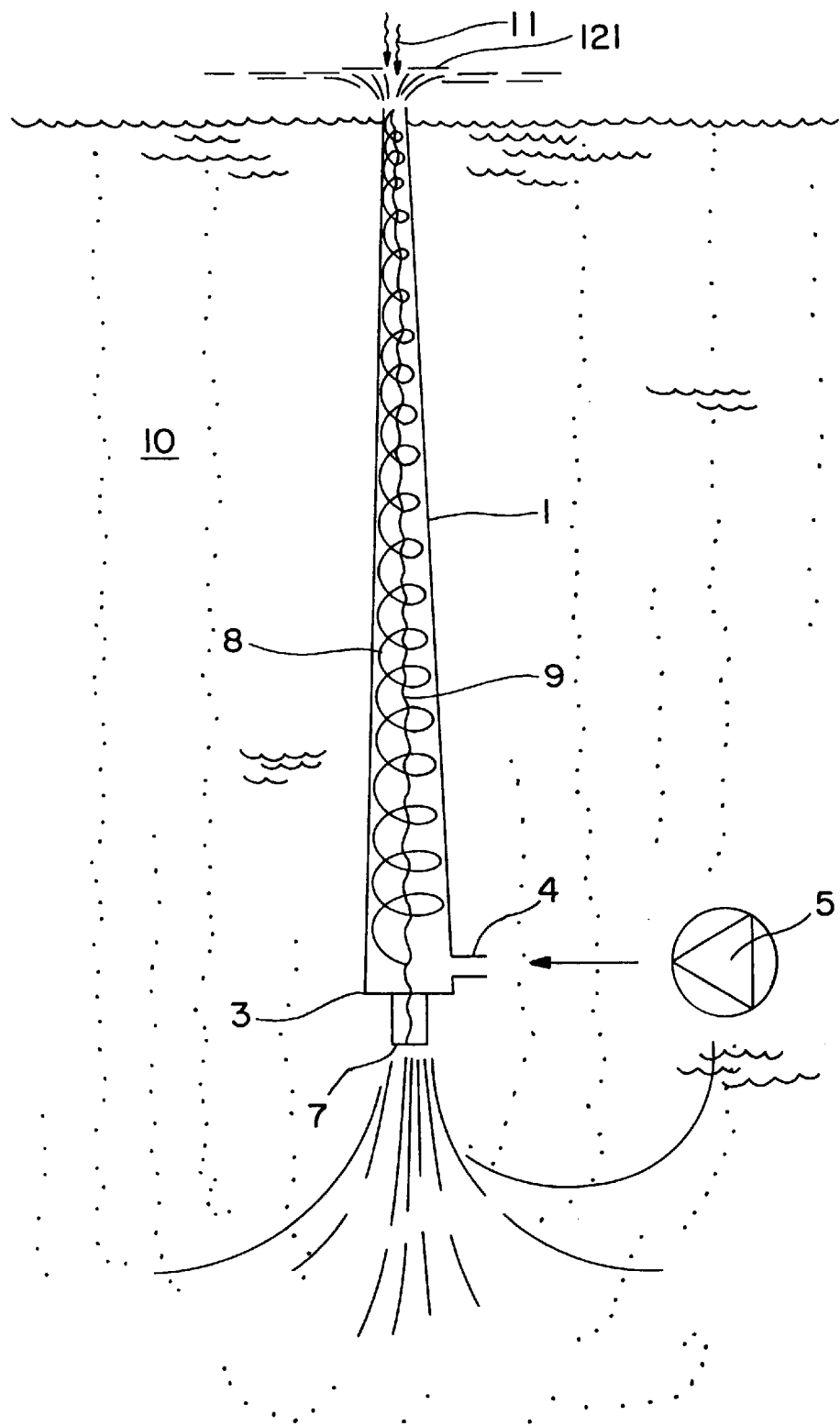
FIG. 1 is a side elevational view of a hydro-cyclone in accordance with the present invention.

The hydro-cyclone shown in FIG. 1 in accordance with the invention is placed in water and includes a cyclone 1 that has its narrow end 2 turned upwards and above the water surface and its wider end 3 with the inlet 4 turned downwards and submerged in water. The inlet 4 is arranged tangentially and at the bottom of the cyclone a central outlet 7 is arranged. Water is fed into the cyclone inlet 4 by pump 5 that in turn is driven by a motor. The motor may be electric or constituted by a petrol engine, wind motor or driven in some other way.

In use, the shown device operates so that water is sucked in by the pump 5 and fed into cyclone 1 where the water due to the feed velocity and direction is directed in a upwards spiral 8 the number of revolutions per minute increasing with the reduction of the radius. Heavy particles are thrown outward and follow the wall of the cyclone upwards. Due to the high rotational speed of the water in the cyclone a downwards directed central cavity 9 is formed from the upper tip of the cyclone and air 11 is sucked in mixing with the water. In addition to a small amount of water being expelled through the upper end of the cyclone in a more or less shower like way together with heavier particles, the major part of the water (80%) is pushed downward and out through the central lower outlet of the cyclone. The water that is discharged out through the lower outlet will also bring along the air that has been mixed with the water at the vortex of the cyclone. The mixing of air and water is so thorough that an efficient oxygenizing is obtained. The water is even saturated with oxygen. The surplus air will form bubbles that when they rise will bring small and light particles along up to the surface (floating) with them.

Figure 2:
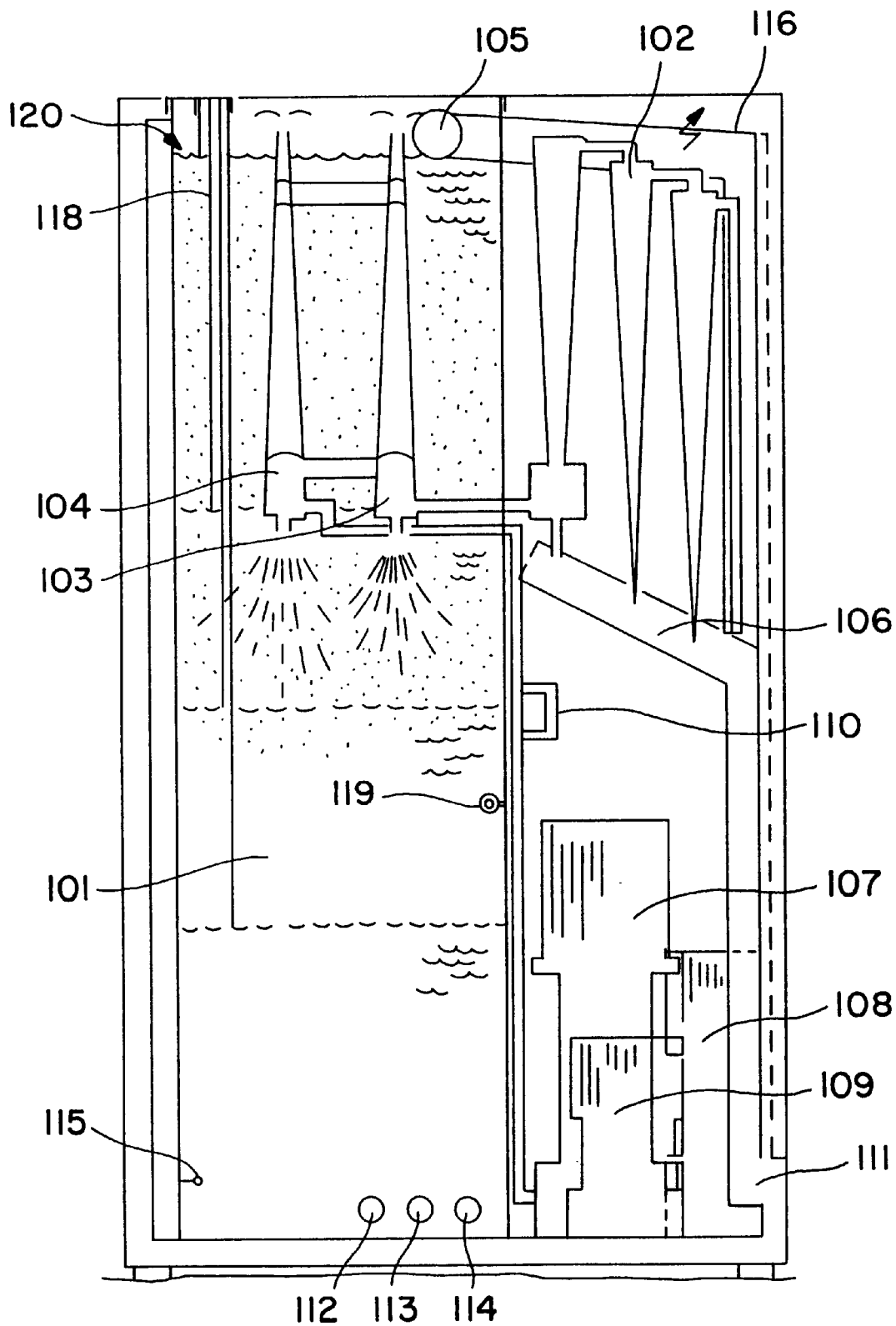
FIG. 2 shows details of a preferred embodiment of the invention for use with a car wash.

The purification unit shown in FIG. 2 is devised and dimensioned for a car wash. The unit is rectangular and has a width or length of 120 cm, a depth of 65 cm and a height of 210 cm. Slightly more than half of the space is taken up by storage tank 101 of 600 liter capacity is for the water that is used to wash cars. Water outlet 112 to the car wash is arranged in the lower end of the tank and connected to pump 108.

In the lower end of the tank is also arranged an outlet 113 which leads to a pump 107 which delivers water to a cyclone 104 arranged in the tank 101. The cyclone 104 is turned so that the pointed end is turned upwards and the broader end of the cyclone is turned downwards in the way that is shown in FIG. 1. The inclination of the walls of the cyclone upwards, the height of the cyclone and the injection speed of the water feed to the cyclone are chosen in such a way that the majority of the water from the cyclone is delivered to the lower end and air is sucked in through the upper end of the cyclone.

The cyclone thus sucks air down into the water in the tank and achieves an oxygenizing effect. The oxygenizing of the water not only enhances aerobic decomposition and a preventing of bad smelling anaerobic processes, but also air bubbles will form and pull small particles in the water up in the water tank to the upper end where a floating outlet 105 is arranged. Not only water flows through this outlet, but also the foam that has been formed by the oxygenizing and particles brought along. The outlet goes to a sludge tank or combined sedimentation and oil separation tank that is placed somewhere else. Such tanks as are intended for separation of oil, sand and mud from the waste water that result at the filling station are known.

Pump 109 pumps the water in the storage tank 101 to a set 102 of purifying cyclones. These are arranged with the pointed end downwards and are coupled in series. The two first ones are of the type that include a thin pointed tip downwards where the particulate together with a small amount of water exits while the majority of the water comes out purified centrally upwards from the cyclone. The third cyclone however lacks a central outlet in the upper and wider end. Instead the purified water is taken out through a broadening of the cyclone shortly above its pointed lower end. In this way lighter particles will be separated from the water this cyclone is fedto an oxygenizing cyclone arranged in the purifying or clearing tank 101. The particles extracted from the water by the cyclone unit 102, heavier as well as lighter, are collected in a sloping channel 106 that transfers into outlet 111 to the sedimentation tank.

In the tank is arranged a fresh water inlet 119 that can be used for the filling of water in case the water level in the system as a whole should fall. In the vicinity of the bottom of the tank 101 may be arranged a conductivity sensor 115 that is used to measure the amount of salt in the water. Frequent saltings in wintertime can cause cars to be coated with salt that of course ends up in the water in the car washes. The salt from the washing function may result in too large a concentration which is environmentally undesired. When too high a salt percentage is measured, the water is tapped to the communal waste water net via outlet 114. The water that is tapped in this way may then be replaced by fresh water via the inlet 119. It deserves to be mentioned that the water that is tapped at this is a maximally purified water in the facility, while the load on the communal waste water net will be minimal from a purification angle.

The purification facility is controlled by electrical control unit 116. Level sensor 118 is arranged for monitoring the water level in the storage tank 101. The uppermost level 120 corresponds to a filled tank, water overflow being possible via the outlet 105 to the sedimentation tank. This level is not continuously necessary but required with certain regularity to allow particles carried with the foam (floatation) to be removed together with freshly oxygenized water to the sedimentation tank for aerobic decomposition.

At the lower ends of the oxygenizing cyclones 103 and 104 or a short distance below this level, the adding of water from the sedimentation tank is initiated. If this level falls further, or if the level in the entire system falls, fresh tap water must be added via the inlet 119.

At 110 is arranged an injector unit that can be used to suck air into water to be taken out from the tank. In order to enhance the floatation effect when needed by increasing the amount of rising bubbles in the tank 101. Also in this way the water to which air has been added by means of an injector may be fed to one of the cyclones.

The hydro-cyclones 103 and 104 in accordance with the invention may have inlet openings with a diameter of approximately 18 mm or slightly less. A length (height) of 70–80 cm and an inclination of 4.5° for the sides, that is a point angle for the conical surface of 9°. The cyclone is then fed with a pressure of 1 kg/ cm$^2$ (100 kPa) or more. Under these conditions the outlet pressure of the water through the lower outlet will be sufficient to expel the water out this way and down into the tank securing circulation in the water volume. An increased feed pressure will produce increased outlet speed downwards with continuous oxygenizing of the water with the upper end drawing in air.

The cyclones 103 and 104 need not be connected in the way that is shown in the drawing but can for instance be coupled via connecting hoses that run over the upper edge of the tank, making it easier to lift them out for service. One can also consider to arrange these two cyclones outside the tank but with connections for the lower ends into the tank and with the upper ends protruding over a collecting tray or the like from which the water may flow to the tank 101 or directly to the outlet 105 and the sedimentation tank. In this way the cyclones, that have as an essential object to oxygenize the water, also purifies the water, the water in the upper end being somewhat less clean than that emerging in the lower end.

As is apparent from the above examples the oxygenizing cyclones in accordance with the invention not only prevents bad smells due to anaerobic decomposition but instead promotes aerobic decomposition that takes place not only in the sedimentation tank but also in the storage tank. As is apparent from the above example the invention thus enables efficient aerobic biological decomposition or purification even in very compact facilities.

Of course, oxygenizing cyclones may also be used for oxygenizing of waste water in larger purification basins. This can be accomplished, for example, by the arrangement of several cyclones located over the surface of the basin. Here the cyclones improve the flow in the basin and the water fed to the cyclones may be the water that is to be purified. Preferably the cyclones may be arranged with floating bodies so that they are independent of the water level, they are on the same depth and have the same working conditions. Also, if desired, a splash or hit panel, shown at 121, may be arranged in front of and/or around the pointed end of the cyclone.

What is claimed is:

1. A device for treating polluted and recycling water to oxygenize the water and to separate polluting particles contained therein, said device comprising a tank for holding said water with air overhead, and having located therein vertically oriented conically tapered open-ended elongate cyclone chamber having an open top end located in the air above the level of the water being treated, and having an open bottom end submerged below the surface of the water being treated, said cyclone tapering from a narrow top end to a wider bottom end, said cyclone having an inlet arranged tangentially adjacent the lower end of the cyclone wherein water to be treated is tangentially introduced into the cyclone whereupon to cause water introduced into the cyclone to rotationally move in a spiral upwards along the inside wall surface of the cyclone, said cyclone including an outlet in the bottom end thereof, whereupon a portion of the water introduced in the cyclone exits the cyclone from the upper end thereof, carrying separated polluting particles, while the majority of the water introduced into the cyclone exits the cyclone from the bottom end with air being entrapped therein, said tank having (a) an outlet adjacent an upper end thereof, wherein particles carried upwards in the cyclone and exiting from the upper end thereof may be removed by skimming, (b) an outlet adjacent the lower end of the tank, wherein treated water may be withdrawn and recycled, and (c) an inlet for maintaining the level of water in the tank.

2. A device according to claim 1, and further including a splash or hit panel arranged adjacent the top end of the cyclone.

3. A device according to claim 1, comprising a plurality of cyclones coupled in series.

* * * * *